//3 UNITED STATES PATENT OFFICE 2,847,445
Patented Aug. 12, 1958

2,847,445

DIBASIC AROMATIC ACIDS AND DERIVATIVES THEREOF

Louis A. Mikeska, Westfield, N. J., assignor to Esso Research and Engineering Company, a corporation of Delaware No Drawing. Application March 24, 1954
Serial No. 418,471

7 Claims. (Cl. 260—465)

This invention relates to dibasic aromatic acids and esters, their method of preparation, and their use as intermediates in the preparation of fiber-forming materials and other products. More particularly it relates to the formation of such dibasic acids based on the reaction of a dimercaptan such as bis-mercapto-methyl durene with an acrylic acid alkyl ester or nitrile, e. g. methyl acrylate or acrylonitrile.

The dibasic acids and esters produced according to this invention are useful intermediates for the preparation of synthetic lubricants, plasticizers and the like. Furthermore, when the carboxyl groups are in para position to each other, valuable fiber-forming resins can be synthesized by condensation with other suitable bifunctional compounds such as glycols or diamines.

The principal reagents used are cyclic dimercaptans or bis-mercaptomethyl aromatics which can be represented by the formula $HS.CH_2.X.CH_2.SH$ wherein X is a 2,3,5,6-tetramethyl phenylene radical. Bis-mercaptomethyl durene, that is, 1,2,4,5-tetramethyl 3,6-dimercaptomethyl benzene, is a particularly preferred starting material because its fully substituted nature and the para position of its two thiomethyl groups result in a combination of properties which make it especially valuable in the preparation of linear fiber-forming polymers.

The foregoing aromatic dimercaptans can be prepared from bis-chloromethylated aromatics by reacting them with thiourea, or with an alkali metal alkyl xanthate, or the like. This type of reaction is fully described and claimed in applicant's copending application Serial No. 405,255, filed on January 20, 1954, now abandoned, and need not be repeated here. Suffice it to indicate here as an example that in carrying out this reaction one mole of the bis-chloromethyl aromatic compound such as bis-chloromethyl durene is reacted with two moles of thiourea or the like to produce the corresponding thiuram compound. The latter is then hydrolyzed, e. g. with aqueous ethanol and sodium hydroxide, whereby the desired dimercaptan is produced. Alternatively, the dimercaptan can be obtained by reacting one mole of the bis-chloromethyl aromatic compound with an alkali metal alkyl xanthate to produce the corresponding bis-alkyl xanthomethyl aromatic which can then be decomposed with ammonia to produce the desired dimercaptan. In any event it will be understood that the preparation of the dimercaptan does not form an inventive feature herein but has been referred to merely as a possible source of the main reagent required in the actual operation of the present invention.

The other main reagent required herein is an acrylic compound which may be represented by the formula $CH_2:CR.Y$ wherein R is selected from the group consisting of hydrogen, chlorine, methyl and ethyl radicals and Y is either a cyanide radical —CN or a carbalkoxy radical COOR' of 1 to 4 carbon atoms per alkoxy group. Accordingly the acrylic compound may be either a nitrile such as acrylonitrile, methacrylonitrile, ethacrylonitrile or chloracrylonitrile, or an ester such as methyl acrylate, methyl methacrylate, isopropyl acrylate, ethyl chloracrylate or the like. In general, methyl acrylate or acrylonitrile are preferred because higher melting and more stable polyesters are obtained as final products.

The reagents are mixed in a ratio of at least about two moles of acrylic compound per mole of dimercaptan. Preferably, however, at least about 3 to 10 moles of acrylic compound are used per mole of dimercaptan since the former serves as an unusually effective solvent which prevents solidification of the reaction mixture and which can be readily recovered by distillation at the end of the synthesis. However, extraneous solvents such as benzene, toluene, xylene, methyl ethyl ketone, dimethyl formamide and the like may be used likewise, though they will tend to retard the reaction to various degrees. Furthermore, if completion of the reaction is not essential and solidification of the reaction mixture is permissible, no surplus reagent or solvent need be present.

The desired reaction between the aromatic dimercaptan and the acrylic compound is best carried out in the presence of any strongly basic catalyst such as sodium methoxide or preferably a quaternary ammonium base such as trimethyl benzyl ammonium hydroxide, tetramethyl ammonium hydroxide, etc. Acid catalysts such as toluene sulfonic acid or hydrogen chloride may be used similarly, but the reaction takes place less efficiently in their presence than in the presence of the basic catalysts. The catalysts may be used, for example, in amounts ranging from about 0.5 to 5 or 10 percent based on the weight of the cyclic dimercaptan. In addition to the foregoing ingredients it is usually also advantageous to add to the reaction mixture a polymerization inhibiting amount of an organic reducing agent such as hydroquinone, phenyl-beta-naphthylamine, 2,6-di-tert-butyl 4-methyl phenol and the like, so as to prevent polymerization of the acrylic compound in the reaction mixture. About 0.1 to 2 percent of the polymerization inhibitor based on the weight of the acrylic compound represents a suitable concentration. The reaction temperature is suitably kept between about 0° C. and 60° C. when acrylic nitriles are being reacted. At higher temperatures the reaction may become too vigorous for optimum results and polymerization of the nitrile also may become more extensive. In the case of the acrylic esters the temperature effect is less pronounced and excellent results can be obtained therewith even when the reaction temperature is allowed to rise 100° C. or even higher. Actually such high temperatures may be preferred in the case of the esters, particularly toward the end of the reaction.

As an illustration, bis-mercaptomethyl durene can be reacted with methyl acrylate to produce a diester, bis-carbmethoxy-ethyl-thiomethyl durene, according to the following equation:

(1) $HS.CH_2.X.CH_2.SH + 2CH_2:CH.COOCH_3 \rightarrow$
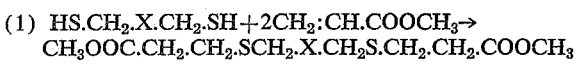

If desired, the resulting diester is then hydrolyzed to give the desired diacid, bis-carboxyethyl-thiomethyl durene, e. g. by dissolving the diester in alcohol and digesting the resulting solution with an aqueous solution of potassium hydroxide as represented below:

(2)
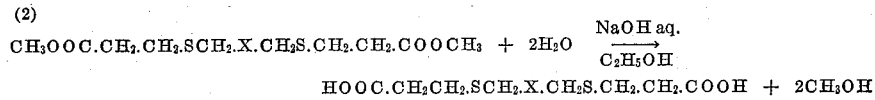

Alternatively, the aromatic dimercaptan can be condensed with a nitrile, followed by hydrolysis or alcoholysis of the resulting dinitrile. This is illustrated by the following equations:

(3)
$$HS \cdot CH_2 \cdot X \cdot CH_2 \cdot SH + 2CH_2{:}CH \cdot CN \longrightarrow$$
$$NC \cdot CH_2 \cdot CH_2 \cdot SCH_2 \cdot X \cdot CH_2 S \cdot CH_2 \cdot CH_2 \cdot CN$$

(4a)
$$NC \cdot CH_2 \cdot CH_2 \cdot SCH_2 \cdot X \cdot CH_2 S \cdot CH_2 \cdot CH_2 CN + 2CH_3OH + 2H_2O \xrightarrow{HCl}$$
$$CH_3OOC \cdot CH_2 \cdot CH_2 \cdot SCH_2 \cdot X \cdot CH_2 S \cdot CH_2 \cdot CH_2 \cdot COOCH_3 + 2NH_4Cl$$

Furthermore, instead of hydrolyzing the dinitrile to form esters and diacids, it is also useful to reduce the dinitrile to form diamines which then can be condensed with various dibasic acids or used for other purposes. The reduction of the dinitrile is illustrated by the equation below:

(4b) $NC \cdot CH_2 \cdot CH_2 \cdot SCH_2 \cdot X \cdot CH_2 S \cdot CH_2 \cdot CH_2 \cdot CN + 4H_2 \rightarrow$
$NH_2CH_2 \cdot CH_2 \cdot CH_2 \cdot SCH_2 \cdot X \cdot CH_2 S \cdot CH_2 \cdot CH_2 \cdot CH_2 NH_2$ As is well-known in reactions of this general type, the reduction of the dinitrile can be effected by hydrogenation in the presence of platinum or Raney nickel catalyst, preferably in the further presence of ammonia gas.

As still another possibility, diesters or diacids of the aforementioned type can be obtained on condensing metal salts of the cyclic dimercaptans, e. g. the sodium salt of bis-mercaptomethyl durene, with any terminally chlorinated carboxylic acid or ester, e. g. with methyl beta-chloropropionic acid. This condensation is illustrated by the following equation:

(5) $NaS \cdot CH_2 \cdot X \cdot CH_2 SNa + 2ClCH_2 \cdot CH_2 \cdot COOCH_3 \rightarrow$
$CH_3OOC \cdot CH_2 \cdot CH_2 \cdot SCH_2 \cdot X \cdot$
$CH_2 S \cdot CH_2 \cdot CH_2 \cdot COOCH_3 + 2NaCl$
bis-carbmethoxyethyl-thiomethyl durene When esters of high molecular weight terminally chlorinated acids such as methyl chlorostearate $$ClCH_2 \cdot (CH_2)_{16} \cdot COOCH_3$$

are used in the condensation reaction and the resulting diester is further condensed with a glycol or the like, the eventual polyesters are oil soluble and will make excellent viscosity index improvers and pour depressants for mineral oil.

Finally, high molecular weight linear polyesters may be prepared from the cyclic mercaptomethyl compounds by condensing their metal salt directly with an alkylene dichloride such as ethylene dichloride or 1,4-dichloro-2-butene or even with a bis-chloromethyl cyclic compound such as bis-chloromethyl durene.

Specific examples will now be given in order to illustrate the invention more completely, though it will be understood that the scope of the latter is not limited thereto.

Example 1

In this example the desired dicarboxylic durene acid was prepared with the aid of methyl acrylate. In this manner bis-carbmethoxyethyl-thiomethyl durene was formed first and this diester was subsequently hydrolyzed to give bis-carboxyethyl-thiomethyl durene.

The procedure employed was as follows:

A three-neck flask equipped with a stirrer, a return condenser, a thermometer and a dropping funnel, was charged with 45 gm. (0.2 mole) of bis-mercaptomethyl durene, 105 ml. (1.2 mole) of methyl acrylate, and about 0.5 gm. of hydroquinone. The dropping funnel was charged with 4.5 ml. of trimethyl benzyl ammonium hydroxide (Triton-B). The reaction mixture was cooled to $-30°$ C. in a Dry Ice-ether bath. Then while stirring, the ammonium base was added drop by drop, at such a rate as to keep the temperature below 50° C. When all the base had been added, the temperature was gradually raised to 100° C. and maintained at this level for two hours.

The reaction mixture was cooled and filtered. On recrystallization of the precipitate from methyl ethyl ketone, 59 gms. of bis-carbmethoxyethyl-thiomethyl durene was obtained as an almost snow-white, crystalline material melting at 125° C. This diester product was quite pure as may be seen from the analysis given below:
Found: C=59.90, H=7.86, S=15.67. Calc. for $C_{20}H_{30}O_4S_2$: C=60.30, H=7.53, S=16.08.

Bis-carboxyethyl-thiomethyl durene was prepared by hydrolysis of the methyl diester described above. To this end, 35 gms. of the diester was dissolved in 160 ml. of 95% ethyl alcohol and treated with 20 gms. of potassium hydroxide dissolved in 40 ml. of water. For better control of the reaction, the alkali was added to the boiling solution of the ester. When all the alkali had been added, the mixture was refluxed for 4.5 hours and finally allowed to cool.

On acidification of the cooled solution, a heavy snow-white precipitate of bis-carboxyethyl-thiomethyl durene was obtained. This diacid product was washed by slurrying several times with water. Air dried, the product weighed 38 gms.

On recrystallization from acetone the diacid product melted at 212° C. It was quite pure as may be seen from the analysis given below:
Found combining weight=183.3. Calc. for $C_{18}H_{26}O_4S_2$ weight=185.0.

Example 2

In this example the diacid was prepared by the alternate method using acrylonitrile as the co-reactant. Accordingly, the bis-mercaptomethyl durene was reacted with acrylonitrile to give bis-cyanoethyl-thiomethyl durene. This dinitrile in turn was reacted with methanol to give bis-carbmethoxyethyl-thiomethyl durene. This last compound, being the diester, was finally hydrolyzed in the same manner as in Example 1 so as to produce the diacid.

The procedure employed was as follows:

Thirty grams (0.13 mole) of bis-mercaptomethyl durene and sixty ml. (1.2 mole) of acrylonitrile together with 0.5 gm. hydroquinone was charged into a three-way flask fitted with a stirrer, a return condenser, a thermometer and a dropping funnel. The dropping funnel was charged with 5 ml. of trimethyl benzyl ammonium hydroxide (Triton-B). The reaction mixture was cooled to about $-45°$ C. in a Dry Ice-ether bath, whereupon the ammonium base was added drop by drop, taking care not to allow the temperature to rise above 60° C. By the time that all the catalyst had been added, the reaction mixture solidified. It was allowed to stand at room temperature for two hours. Water was then added, and the mixture was filtered by suction.

To purify the precipitate, it was slurried several times with water whereupon it was air dried at room temperature. In this state of purity the dinitrile product weighed 50 gms. and consisted of a yellow powder. On recrystallization from acetone the dinitrile melted at 195° C., and was almost snow white.

The dinitrile described above was converted into the dimethyl ester, that is, bis-carbmethoxyethyl-thiomethyl durene, as follows:

A three-way flask equipped with a stirrer, a return condenser, a thermometer and an inlet tube for hydrogen chloride, was charged with 15 gms. of the dinitrile, together with 150 ml. of methyl alcohol. Then while stirring and refluxing, dry hydrogen chloride was passed through the reaction mixture. This was continued for four hours. The mixture was then cooled, diluted with water, and filtered. The precipitate weighed 17.5 gms. and melted at 121–122° C. One recrystallization from methyl ethyl ketone the diester product melted at 126° C. which agrees with the melting point of the methyl ester prepared directly by condensing bis-mercaptomethyl durene with methyl acrylate as described in Example 1. The diester was finally converted to the diacid in the same manner as in Example 1. In preparing polyesters it is usually preferable to use the diesters, rather than the diacids, as the starting material; the diesters are generally more readily soluble than the diacids and, unlike the latter, permit using a basic condensation catalyst. Nevertheless, sometimes the diacids are preferred in the condensation reaction.

The diacids, or preferably the diesters of the present invention can be condensed with various difunctional compounds such as glycols, e. g., hexamethylene glycol, or with diamines, e. g. hexamethylene diamine, or with dimercaptans, alkylolamines, hydroxymercaptans, aminomercaptans, etc. to form high molecular weight polymers useful as resins of various sorts. When, as stated above, the two carboxyl groups of the diacids are in para position to each other, they are particularly valuable as intermediates in the formation of linear, fiber-forming polymers. This is further illustrated in Example 3 below.

When the diacids are condensed with monofunctional compounds such as alcohols, monoamines, or monomercaptans, products are obtained which may be useful as insecticides, additives for lubricating oil, and so forth.

*Example 3*

A fiber-forming polyamide of the diacid obtained in Example 1 was prepared as follows:

A Claisen flask equipped with a receiver and an inlet tube for nitrogen was charged with 36 ml. of 70% hexamethylene diamine and 18.5 gms. (0.05 mole) of the bis-carboxyethylthiomethyl durene described in Example 1. Then while passing nitrogen through the reaction mixture, the temperature was gradually raised. At first water was distilled at 100°–103° C. Later a small amount of solid material distilled over. When the temperature in the reactor reached 220° C. it was maintained at this level for three hours. At this point, the pressure was reduced from atmospheric pressure to two mm. Hg, and heating at 220° C. was continued for two hours. An additional small amount of distillate was obtained and the material in the reactor became very viscous.

A quantitative test on a small sample of the reactor contents showed that the reaction product could now be drawn into fibers from its melt with great ease. The fibers, however, still had a sticky feel.

Hence the temperature was raised to 260° C. and heating at this level under 1 mm. Hg pressure was continued for one hour. A quantitative test showed that this product could now be drawn into fibers with great ease. The resulting fibers were solid and strong, and completely devoid of any stickiness.

The fiber-forming condensation product can be represented by the formula

[—OC.$(CH_2)_2$.S$CH_2$.X.$CH_2$S.$(CH_2)_2$.CO.NH$(CH_2)_6$.NH]$_n$ wherein X is a 2,3,5,6-tetramethyl phenylene radical.

Having described the general nature and specific examples of the invention, it will be understood that the scope and spirit of the invention is not necessarily restricted thereto except as more particularly pointed out in the appended claims.

I claim:

1. A process for making bifunctional derivatives of cyclic hydrocarbons which comprises reacting one mole of a bis-mercaptomethyl cyclic compound having the formula HS.$CH_2$.X.$CH_2$SH wherein X is 2,3,5,6-tetramethyl phenylene, with at least three moles of an acrylic compound having the formula $CH_2$:CR.Y wherein R is selected from the group consisting of hydrogen, chlorine, methyl and ethyl radicals, and Y is selected from the group consisting of carbalkoxy and cyanide radicals.

2. A process according to claim 1 wherein the acrylic compound is methyl acrylate.

3. A process according to claim 1 wherein the acrylic compound is acrylonitrile.

4. A new compound having the formula

R'.$CH_2CH_2$.S.$CH_2$.X.$CH_2$.S.$CH_2CH_2$.R' wherein X is a 2,3,5,6-tetramethylphenylene radical and R' is a radical selected from the group consisting of $CH_3OOC$—, HOOC— and NC—.

5. As a new compound, bis-carbalkoxyethyl-thiomethyl durene.

6. As a new compound, bis-carboxyethyl-thiomethyl durene.

7. As a new compound, bis-cyanoethyl-thiomethyl durene.

References Cited in the file of this patent

UNITED STATES PATENTS

| | | |
|---|---|---|
| 2,191,556 | Carothers | Feb. 27, 1940 |
| 2,199,799 | Jacobson | May 7, 1940 |
| 2,389,628 | Martin | Nov. 27, 1945 |
| 2,543,187 | Moore | Feb. 27, 1951 |
| 2,559,521 | Smith | July 3, 1951 |
| 2,654,773 | Zerbe | Oct. 6, 1953 |

FOREIGN PATENTS

| | | |
|---|---|---|
| 814,596 | Germany | Sept. 24, 1951 |
| 849,244 | Germany | Sept. 11, 1952 |

OTHER REFERENCES

Hickinbottom: "Reactions of Organic Compounds," p. 30, 1948.